Dec. 24, 1940.  J. T. ASWAD  2,226,302
CENTERING GAUGE FOR STONEWORK
Filed Feb. 7, 1939  2 Sheets—Sheet 1
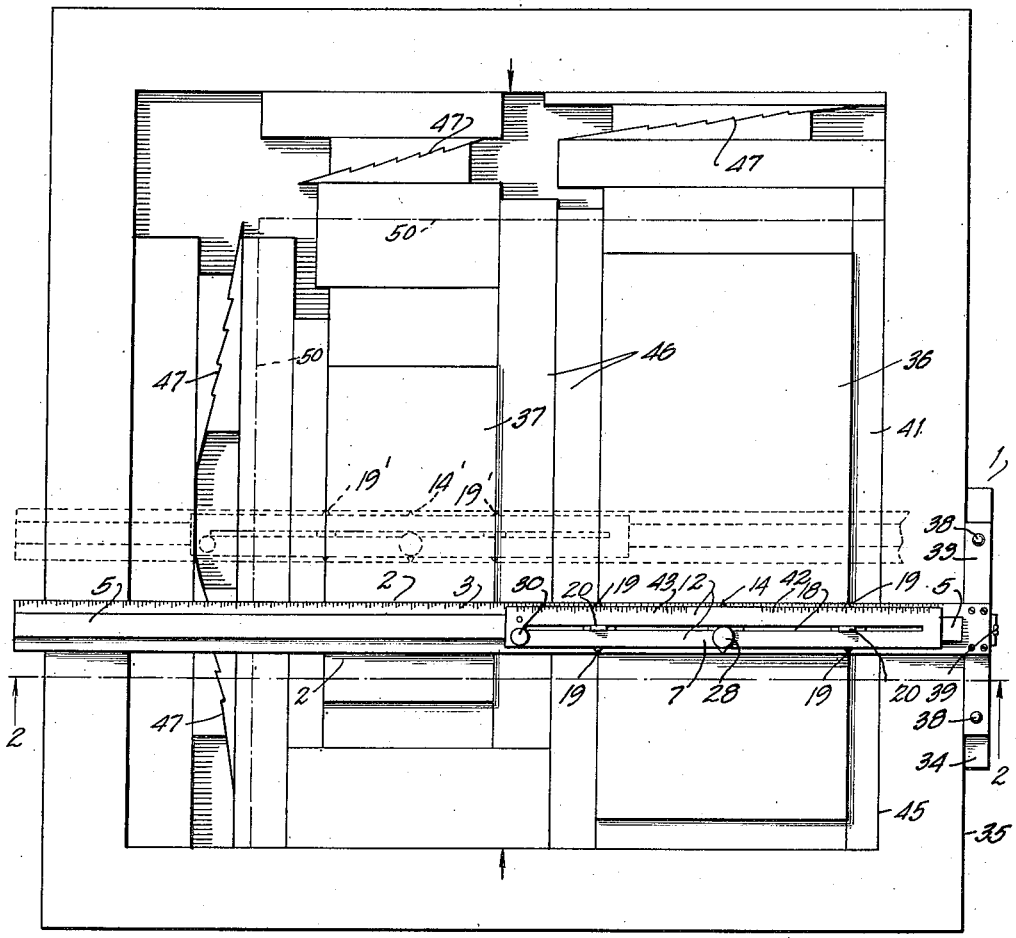
Fig. 1.
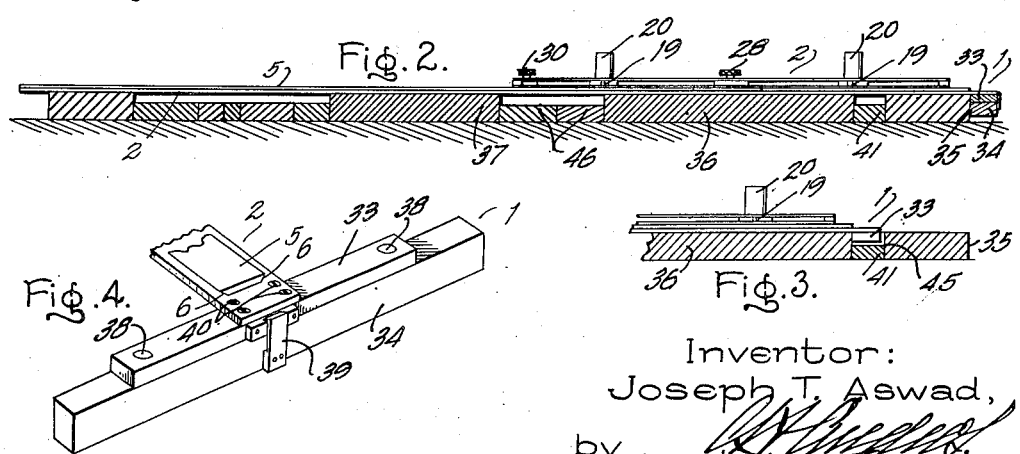
Fig. 2.
Fig. 3.
Fig. 4.
Inventor:
Joseph T. Aswad,
by His Attorney.

Dec. 24, 1940. J. T. ASWAD 2,226,302
CENTERING GAUGE FOR STONEWORK
Filed Feb. 7, 1939 2 Sheets-Sheet 2
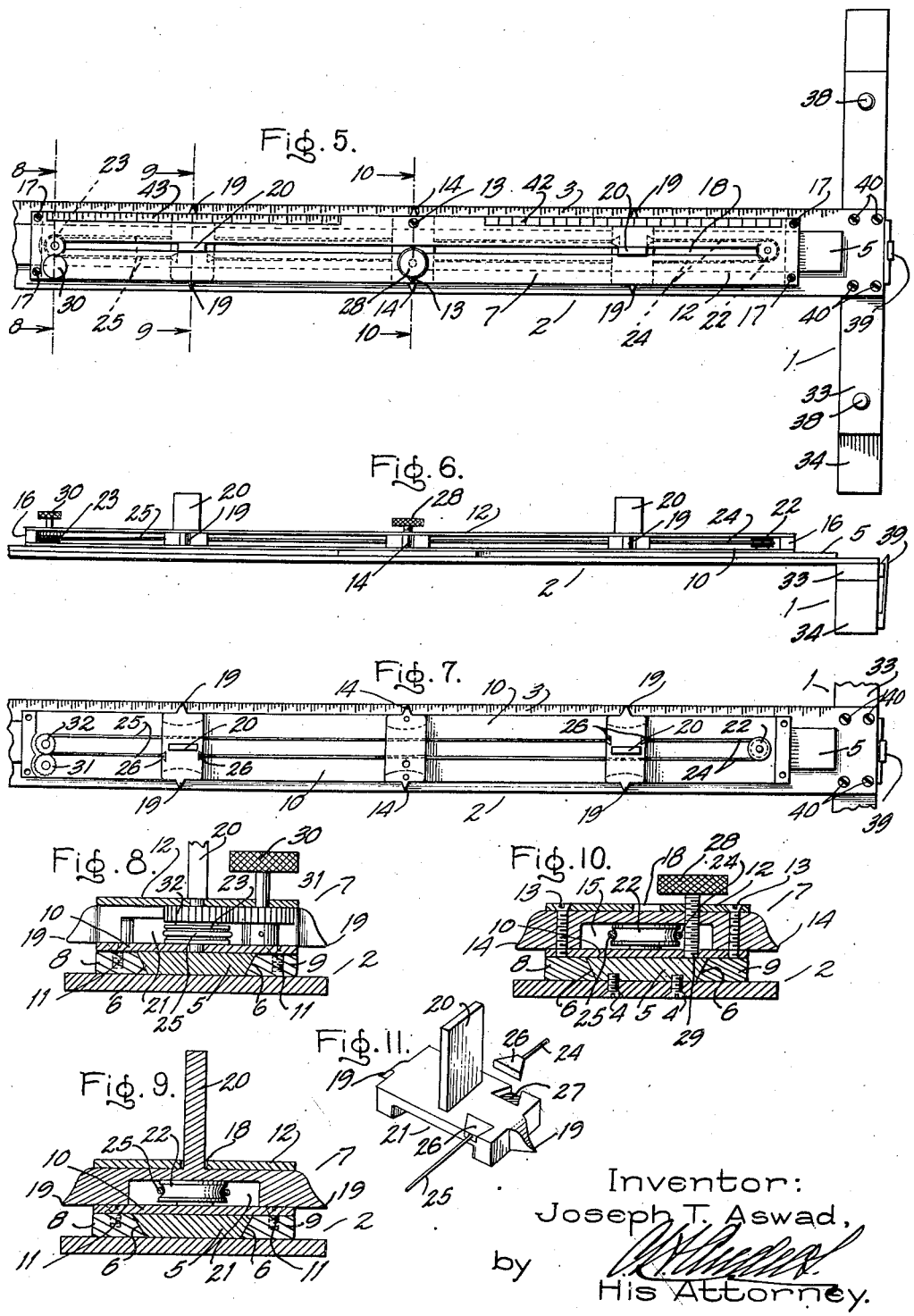
Inventor:
Joseph T. Aswad,
by
His Attorney.

Patented Dec. 24, 1940

2,226,302

UNITED STATES PATENT OFFICE 2,226,302

CENTERING GAUGE FOR STONEWORK

Joseph T. Aswad, Albany, N. Y.

Application February 7, 1939, Serial No. 255,087

6 Claims. (Cl. 33—189)

My invention relates to the art of printing and particularly to a gauge whereby type pages may be quickly and accurately positioned relative to each other in a chase.

In book printing, the pages are printed two, or some multiple of two, at a time, and on stock of given size. The widths of the type pages are frequently unequal, but these type pages must be positioned and locked in the chase so that in the printing operation the printed pages are symmetrically disposed about the center line of each half of the stock. To position the type pages properly in the chase requires measurements and calculations and the primary object of my invention is to provide a gauge whereby this operation may be performed with a minimum time and effort.

With this and other objects in view, my invention includes the novel elements and the combinations and arrangements thereof described below and illustrated in the accompanying drawings in which—

Fig. 1 is a plan view of a two page form or chase having type pages locked therein in proper relative position;

Fig. 2 is a section of Fig. 1 in the plane 2—2;

Fig. 3 is a fragmentary vertical section view illustrating how my gauge may be used by setting it against the edge of one of the type pages;

Fig. 4 is a fragmentary perspective view illustrating the head of the gauge and a portion of the blade;

Fig. 5 is a fragmentary plan view of the gauge;

Fig. 6 is a fragmentary elevation view of the gauge;

Fig. 7 is a fragmentary plan view of the gauge with certain parts removed to show the interior construction;

Fig. 8 is a section of the gauge in the plane 8—8 of Fig. 5;

Fig. 9 is a section of the gauge in the plane 9—9 of Fig. 5;

Fig. 10 is a section of the gauge in the plane 10—10 of Fig. 5; and

Fig. 11 is a perspective view of one of the movable margin indexes illustrating how the cables which effect simultaneous movement of these indexes are connected thereto.

Referring to the drawings and particularly to Figs. 4-10, inclusive, my gauge comprises a T square comprising a head represented generally by the numeral 1 and a blade secured at right angles to the head 1 and represented generally by the numeral 2. At least one of the edges of the blade is graduated, preferably in inches, as shown at 3. Secured to the top of the blade by means of screws 4 (see Fig. 10) is a flat element or guide 5 of a length substantially coextensive with the blade (see Fig. 1), and which has downwardly and inwardly extending beveled edges 6. The guide 5 forms a means whereby what I have termed the index housing of the gauge and which is represented generally by the numeral 7 is secured in longitudinally slidable relation to the blade 2. The housing 7 comprises spaced strips 8 and 9 which extend longitudinally of the blade and which have their opposed or inner edges downwardly and outwardly beveled and so spaced as to cooperate slidably in dove tail relation with the beveled edges 6 of the guide 5. The strips 8 and 9 are secured together in spaced relation by means of a cover plate 10 and screws 11. At the center of the housing and secured in fixed relation thereto between the cover plate 10 and the top cover 12, by means of screws 13, is a center index 14 which has its bottom central portion cut out or removed to form a passage 15 extending therethrough in a direction longitudinally of the blade. The top cover plate 12 is secured, at the ends, in spaced vertical relation to the lower cover plate 10 by means of the spacing blocks 16 and screws 17. The top cover plate 12 is provided with a centrally disposed longitudinally-extending slot 18 which serves as a guide for the vertically-extending finger grips 20 of the margin indexes 19 which pass therethrough, as best shown in Figs. 1, 5 and 9. It is understood that the blocks 16 space the upper and lower cover plates 12 and 10 respectively so that the margin indexes may slide freely therebetween. The construction of the sliding margin indexes may be clearly understood by reference to the perspective view shown in Fig. 11 where it will be noted that the bottom central portion is cut out as shown at 21 to provide a passage beneath the indexes extending longitudinally of the blade.

At the opposite ends of the housing and rotatively mounted on vertical axes between the top and bottom cover plates are pulleys 22 and 23 around which are rove flexible wire belts 24 and 25, respectively. The free ends of both belts are provided with wedge-shaped lugs 26 adapted to be received in cooperating wedge-shaped recesses 27 in the tops of the margin indexes (see Fig. 11). By reference to Fig. 7 it will be noted that one end of the belt 24 which passes around pulley 22 is secured to one side of the right hand margin index while the other end of the belt 24 is secured to the left hand margin index. Similarly, the belt 25 which passes around the pulley 23 has one end secured to the right hand margin index and the other end secured to the left hand margin index. Thus, it will be apparent that the movement of one of the margin indexes toward or away from the center index 14 will also move, through the medium of the belt and pulleys, the other index in the same direction relative to the center index. That is to say, the margin indexes will move together either toward or away from the center index.

In order to clamp the housing to the blade in non-slidable relation when the center index has been located in the desired position a set screw 28 is provided in the center of the housing. The screw 28 is threaded through the cover plates and the center index and has its end 29 bearing on the guide 5. By tightening this screw against the guide, sliding movement of the housing relative to the blade is prevented. While the margin indexes may be readily moved by grasping the vertically extending portions 20, or either of them, with the fingers, I may, if desired, provide the knurled finger wheel 30 at one end of the housing as an index moving means. The vertical shaft on which the finger wheel 30 is mounted also carries a gear 31 which meshes with a gear 32 fixed to the pulley 23. Thus, by turning the finger wheel 30 the margin indexes may be moved toward or away from the center index.

The head 1 of the T square comprises two superposed parts 33 and 34 (see Fig. 4) and the combined depth or thickness of the parts 33 and 34 is such that the head of the square may engage an edge or side of the chase 35 when the blade 2 rests flat on the type pages 36 and 37.

Where more than two type pages are locked in a chase, it is desirable, in order to limit the length of the T square blade to have a head of reduced depth such that, instead of always being used against the edge or side of the chase, it may be used against the side or edge of one of the type pages and still have the blade lie flat on the type. For this reason, the portions 33 and 34 of the head are made separable and are secured together by means of aligning pins 38 secured to the part 34 and which are received in holes in the part 33, and by means of the spring latch 39. By pulling the latch outwardly the part 34 may be removed leaving only the part 33 which is secured to the blade portion by means of the screws 40. Thus, the head, which must be of a considerable depth or thickness to permit it to be used against the side of the chase, as shown in Fig. 1, is reduced to the thickness or depth of the portion 33 so that it may be used against the edge of the type page 36 and yet clear the furniture 41 as shown in Fig. 3.

In Fig. 1 I have illustrated the application of my gauge to a two page form in which the type pages 36 and 37 are of different widths, say 5″ for page 36 and 3″ for page 37, and in which the printing is to be done on stock 50 say 12″ in width. It is required, as stated above, that the printing be centered in each half of the stock. Since half the width of the stock is 6″, there should be a margin of ½″ at each side of the 5″ type page 36. There is, of course, no mark indicating the center of the type page and the centering must be done by properly positioning the edges thereof.

With the head of the gauge engaging the edge of the chase 35, as shown in Fig. 1, the center index 14 is moved to the position where the center of the type page must be located and secured in adjusted position by means of the set screw 28. The top cover plate 12 has graduations thereon running each way from the center gauge 14. The graduations 42 to the right of the center gauge may be in ems and the graduations 42 to the left of the center gauge in inches. Having in mind that the width of the first type page 36 is 5″, the margin indexes 19 are moved toward or away from the center index 14 by means of the finger grips 20 or the wheel 30 until they are positioned 2½″ each way from the center gauge. The type page 36 is then moved in the chase until its edges register with the margin indexes 19 and furniture 41 of the proper width or thickness is placed between the right hand edge of the type page 36 and the inside edge 45 of the frame. The center of the type page 37 must be 6″ from the center of the type page 36 and this center is located in space, so to speak, by loosening the set screw 28 and moving the index 14 to the position 14' as shown by the dotted lines in Fig. 1. Having in mind that the width of the page 37 is 3″, the margin indexes 19 are moved inwardly to the positions 19', so that they are 3″ apart and 1½″ at either side of the index 14'. Furniture 46 of the proper width is placed in the chase against the left edge of type page 36, and type page 37 is positioned up against it so that its edges register with the marginal gauges 19'. Other furniture (not indicated by any reference numbers) is then placed in the frame to fill up the balance of the space at the sides, top, and bottom and the type pages and the furniture and type are locked in the frame by means of the quoins 47 in the usual manner. If more than two pages are to be set up in the form and the blade of the gauge is not long enough to reach across the other pages when the head engages the edge 35 of the chase, the lower portion 34 of the head may be removed by releasing the latch 39 and the remaining portion 33 of the head may be used against the edge of any page, such for example as page 36, in the manner shown in Fig. 3.

From the foregoing it will be apparent that my device is extremely simple to use and that it will facilitate the centering of the type pages in the chase.

What I claim is:

1. In a centering gauge for stone work, the combination with means forming a T square including a flat, elongated blade, an index housing, means securing said housing to the top of said blade in freely slidable relation thereto, a center index on said housing, a margin index on said housing at either side of said center index, means securing said margin indexes to said housing in freely slidable relation thereto whereby said margin indexes may be moved toward and away from said center index, and means for maintaining said margin indexes equidistant from said center index.

2. In a centering gauge for stone work, the combination with means forming a T square including a flat, elongated blade, an index housing, means securing said housing and blade together in freely slidable relation, means for clamping said housing and blade together in non-slidable relation, a center index on said housing, a margin index carried by said housing at either side of said center index, means securing said margin indexes to said housing in freely slidable relation thereto whereby said margin indexes may be moved toward and away from said center index, and means for maintaining said margin indexes equidistant from said center index.

3. A centering gauge of the character described comprising a T square including a head and blade, linear measuring graduations along one edge of said blade, a center index cooperating with said graduations, a mounting for said center index securing it to said blade in longitudinally slidable relation thereto, margin indexes carried by said mounting and positioned at either side of said center index and equidistant therefrom, linear measuring graduations on said mounting cooperating with at least one of said margin indexes, and means for simultaneously moving said margin indexes toward and away from said center index while maintaining them equidistant therefrom.

4. The structure set forth in claim 3 together with means for clamping said blade and mounting together in non-slidable relation.

5. A centering gauge for stonework comprising a T-square including an elongated blade, an index assembly comprising a center index and symmetrically-disposed, manually-movable margin indexes at either side thereof, means connecting said blade and assembly together in freely slidable relation, and means connecting said margin indexes together in freely slidable relation to said center index for simultaneous movement towards or away from said center index; whereby direct manual movement of one of said margin indexes will effect a like movement of the other margin index relative to the center index through said connecting means.

6. In a centering gauge, the combination with means forming a T square including an elongated blade having linear measuring graduations along one edge thereof, a center index cooperating with said graduations, a margin index at each side of said center index, means securing all said indexes to said blade in longitudinally slidable relation thereto as an assembly, and means including finger engageable means on one of said margin indexes for simultaneously moving both said margin indexes toward and away from said center index.

JOSEPH T. ASWAD.